(12) United States Patent
Faber et al.

(10) Patent No.: US 9,920,221 B2
(45) Date of Patent: Mar. 20, 2018

(54) HYDROGENATED NATURAL OILS IN RUST PREVENTATIVE COATINGS

(71) Applicant: The Lubrizol Corporation, Wickliffe, OH (US)

(72) Inventors: Ben Faber, Cleveland Heights, OH (US); Maryyum Nasir, West Chester, OH (US); Jennifer Clark, Reminderville, OH (US); Hannah Greenfield, Belper (GB); Kristi Swank, Massillon, OH (US); Britt Minch, Painesville Township, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 15/103,486

(22) PCT Filed: Dec. 12, 2014

(86) PCT No.: PCT/US2014/069934
§ 371 (c)(1),
(2) Date: Jun. 10, 2016

(87) PCT Pub. No.: WO2015/094942
PCT Pub. Date: Jun. 25, 2015

(65) Prior Publication Data
US 2016/0312067 A1    Oct. 27, 2016

Related U.S. Application Data

(60) Provisional application No. 61/918,166, filed on Dec. 19, 2013.

(51) Int. Cl.
| | |
|---|---|
| *C09D 191/06* | (2006.01) |
| *C09D 5/08* | (2006.01) |
| *C09D 7/00* | (2018.01) |
| *C09D 7/12* | (2006.01) |
| *C08K 5/42* | (2006.01) |
| *C08K 5/092* | (2006.01) |
| *C08K 5/103* | (2006.01) |

(52) U.S. Cl.
CPC ............. *C09D 191/06* (2013.01); *C09D 5/08* (2013.01); *C09D 7/001* (2013.01); *C09D 7/125* (2013.01); *C09D 7/1233* (2013.01); *C08K 5/092* (2013.01); *C08K 5/103* (2013.01); *C08K 5/42* (2013.01); *C08K 2201/014* (2013.01); *C08L 2205/025* (2013.01)

(58) Field of Classification Search
CPC .................................................... C09D 191/06
USPC ......................................................... 428/457
See application file for complete search history.

(56) References Cited

U.S. PATENT DOCUMENTS

| | | | |
|---|---|---|---|
| 4,946,503 | A | 8/1990 | Hattori et al. |
| 5,074,913 | A | 12/1991 | Trivett |
| 6,017,370 | A | 1/2000 | Manka et al. |
| 6,312,509 | B1 | 11/2001 | Moradian |
| 7,737,099 | B2 | 6/2010 | Applewhite et al. |
| 8,409,340 | B1 | 4/2013 | Kharshan et al. |
| 9,187,651 | B2 | 11/2015 | Minch |

FOREIGN PATENT DOCUMENTS

| | | |
|---|---|---|
| EP | 1038933 | 9/2000 |
| EP | 1344801 | 9/2003 |
| EP | 1612293 | 1/2006 |
| GB | 1249144 | 10/1971 |
| WO | 9607720 | 3/1996 |
| WO | 9962973 | 12/1999 |
| WO | 2008122028 | 10/2008 |
| WO | 2013142684 | 9/2013 |

*Primary Examiner* — Terressa Boykin
(74) *Attorney, Agent, or Firm* — Michael A. Miller; David M. Shold

(57) ABSTRACT

A coating composition of a first triglyceride having a melting point of at least 35° C.; a second triglyceride having a melting point of less than 35° C.; a hydrocarbon-soluble ester-containing polymer; a carboxylic diacid or polyacid having at least 10 carbon atoms; and a metal salt of an alkylarylsulfonate in a hydrocarbon oil, provides good rust protection.

20 Claims, No Drawings

HYDROGENATED NATURAL OILS IN RUST PREVENTATIVE COATINGS

BACKGROUND

The disclosed technology relates to corrosion- or rust-preventive coating compositions and methods of their use. The compositions comprise a higher and a lower melting triglceride (which may be one or more hydrogenated natural oils) and a solubility agent, optionally in a hydrocarbon medium.

Rust preventive coatings have been known to comprise a mineral (hydrocarbon) wax in a solvent or other liquid medium. Such coatings have been applied to metal surfaces, especially ferrous surfaces, as a rust preventative. They may be distinguished from other types of coatings such as paints in that the wax-containing coatings are often of a relatively temporary nature, imparting rust inhibition over a term of days or perhaps years, and in some instances being removed prior to further treatment of or working with the metal surface.

Coating and anti-rust compositions are known. For instance, WO 2013/134062, Lubrizol, Sep. 12, 2013, discloses waterborne coatings that provide improved corrosion protection. The composition may include water, a polymer resin component, and a corrosion inhibiting component comprising a first complexing agent comprising a trialkanol amine and a second complexing agent comprising a carboxylic acid.

U.S. Pat. No. 5,074,913, Trivett, Dec. 24, 1991, discloses hot melt pipe coating compositions. One disclosed formulation comprises 10% by weight of the triglyceride of 12-hydroxystearic acid, 25% by weight of polymerized aliphatic terpene hydrocarbon resin, 44% by weight ethylene copolymer, 20% by weight synthetic paraffin wax, and 1% by weight antioxidant.

U.S. Pat. No. 7,737,099, Applewhite et al., Jun. 15, 2010, discloses compositions and methods for the prevention and treatment of corrosive processes such as rust. The compositions may include an organic acid or salt, a natural gum and/or wax and/or wax extract, and water.

U.S. Pat. No. 8,409,340, Kharshan et al., Apr. 2, 2013, discloses bio-based corrosion inhibitors, e.g., "distillers dried grains with solubles" extract, which was analyzed to contain 16 and 18 carbon fatty acids and ethyl esters, among other components.

GB 1 249 144, Esso Research and Engineering Company, Oct. 6, 1971, discloses an organic rust inhibiting composition comprising an aqueous ammonia gelled overbased alkaline earth metal sulfonate, a coating material which is a hydrocarbon polymer resin or a mixture of a hydrocarbon polymer resin, wax, and ethylene-vinyl acetate copolymer, and a hydrocarbon solvent.

U.S. Pat. No. 6,312,509, Moradian, Nov. 6, 2001, discloses a rust preventive coating composition including a microcrystalline wax, naphthenic and paraffinic oils, oils-soluble alkali-metal sulfonate, or other components.

U.S. Pat. No. 4,946,503, Hattori et al., discloses a rust preventive coating composition comprising asphalt, metallic salt of petroleum sulfonic acid, metallic salt of petrolatum oxide, wax-like material, microwax, and other components.

EP 1 038 933, Kawasaki Steel Corporation, Sep. 7, 2000, discloses a coating composition comprising a methacrylic resin prepared by copolymerizing styrene or a substituted styrene, a methacrylic ester, and an olefinic compound having at least one carboxylic group.

Ester-containing polymers are also known. WO 96/07720, Exxon Chemical Patents, Mar. 14, 1996, discloses compositions comprising an ethylene/vinyl acetate or propionate/vinyl linear carboxylate terpolymer. In an example, a polymer is prepared from vinyl octanoate, vinyl acetate, and ethylene. They are useful for improving the low-temperature properties of certain oils. WO 99/62973, Infineum USA, Dec. 9, 1999, discloses copolymers formed from dialkyl phenyl fumarate and at least one comonomers formed form the group consisting of vinyl acetate, styrene, $C_3$ to $C_{30}$ α olefin, ethylene, and carbon monoxide. In an example, copolymers of dialkyl phenyl fumarate with vinyl acetate were synthesized with R groups of $C_{12}H_{25}$, $C_{24-28}H_{49-57}$, $C_{30}H_{61}$. U.S. Pat. No. 6,017,370, Manka et al., Jan. 25, 2000, discloses a liquid composition containing a polymer of a $C_{8-10}$ alkyl ester of an ethylenically unsaturated 1,2-diacid.

It would be desirable obtain alternative waxes from sustainable, renewable sources, at a relatively low cost, and which provide very good rust inhibiting performance, including good film integrity and few premature failures.

A possible source of alternative waxes is natural (renewable) products such as animal or vegetable oils or fats (waxes). Animal and vegetable oils and fats are triglycerides of fatty acids of various types, the specific acid depending on the source of the oil. Often different fatty acid components are present within a single triglyceride molecule, and the specific mixtures and combinations will affect the nature of the oil or fat. The triglycerides will be characterized as oil or waxes (fats) generally on the basis of whether they are liquid a room temperature (oils) or solid or semi-solid at room temperature (fats or waxes). Chemically, triglycerides that contain alkyl chains containing unsaturation are typically classified as oils, while fats or waxes often contain saturated or more nearly completely saturated alkyl chains. The waxes would be expected to be more suitable than oils in anti-rust coating compositions, because their higher melting points will make them more likely to remain on the metal surface, rather than being removed by natural flow or by contact with other materials.

Triglyceride oils may be converted into waxes by partial or complete hydrogenation of one or more of the double bond or bonds in the alkyl chains. Since such waxes are readily available, they would be possible candidates for use in rust preventive coatings. However, a problem arises because of generally inadequate solubility of triglyceride waxes in solvents that are typically used in preparing or applying rust preventive compositions. Poor solubility can lead to precipitate formation in the final coating product and poor corrosion protection.

The disclosed technology, therefore, solves one or more of the problems of providing a wax from a natural source rather than a hydrocarbon wax; and providing a composition which exhibits good solubility in oils or volatile solvents while simultaneously providing good rust or corrosion inhibition to a metallic surface to which it is applied.

SUMMARY

The disclosed technology provides a coating composition comprising: (a) a first triglyceride having a melting point of 35° C. to 65° C.; (b) a second triglyceride having a melting point of less than 35° C.; (c) a hydrocarbon-soluble ester-containing polymer having at least one branch of 10 to 36 carbon atoms and having a number average molecular weight of 5000 to 300,000; (d) a carboxylic diacid or polyacid having at least 10 carbon atom, provided that if the diacid or polyacid is a diacid having two carboxylic acid groups on adjacent carbon atoms, then said diacid will have at least 14 carbon atoms; (e) a salt of an alkylarylsulfonic acid, wherein the alkyl group thereof is of sufficient length to provide solubility of the salt in a hydrocarbon oil; and (f) a hydrocarbon oil in an amount sufficient to dissolve said salt.

The disclosed technology further provides a method for providing rust protection to a ferrous metal surface, comprising applying thereto any of the above-described coating compositions.

DETAILED DESCRIPTION

Various preferred features and embodiments will be described below by way of non-limiting illustration.

The coating composition provides a mixture of triglycerides. Triglycerides are well known to be esters of fatty acids with glycerol and are prominent components of, or are or derived from animal fats or oils or vegetable fats or oils. By the term "fatty acid" is meant one or a mixture of aliphatic carboxylic acids containing from 8 to 24 carbon atoms, and often 12 to 20 or 14 to 18 or 16 to 18 carbon atoms, although small amounts of acids outside of these ranges may also be present.

Naturally occurring triglycerides typically contain (that is, may provide upon hydrolysis) a mixture of fatty acids, some of which may contain substituents such as a hydroxy group, and many of which contain ethylenic unsaturation. While lauric acid (C12), palmitic acid (C16), and stearic acid (C18) are saturated, other fatty acids contain 1 or 2 sites of ethylenic unsaturation, e.g., palmitoleic acid (C16, 1 double bond), oleic acid (C18, 1 double bond), lineoleic acid (C18, 2 double bonds), or linolenic (C18, 3 double bonds). The number of double bonds, among other variables, affects the melting point of the triglyceride, those with saturated acid groups generally being of higher melting point. Triglycerides containing unsaturated acids are characteristic of oils while those containing saturated acids are characteristics of fats or waxes (those terms often being used interchangeably). The length of the carbon chain may also play a role, longer carbon chain acids tending to give a higher melting point and a tendency toward waxiness.

It is known to those skilled in the art that hydrogenation (full or partial) of triglyceride oils leads to increased saturation and increased melting points. Hydrogenation may be conducted by any known means, such as by treatment with hydrogen gas in the presence of finely divided nickel. The oils may then be converted to waxes of a desired melting point, depending in part on how severely the hydrogenation is conducted. Such hydrogenated materials are commercially available from a variety of sources. The trigylcerides of the disclosed technology may, in one embodiment, each independently comprise a hydrogenated vegetable oil. In one embodiment, one or more of the triglycerides of (a) and (b) is not hydrogenated, in which case the triglycerides are nevertheless selected such that the specified melting points are obtained.

The disclosed technology employs a combination of triglycerides of higher and lower melting points. In particular, there will be used a higher-melting wax having a melting point of at least 35° C., and up to 65° C. The upper limit is not so firmly fixed, but it is desired to have a wax that is readily processed without excessive heating. Suitable melting points for the higher-melting wax may include the ranges of 38 to 60 or 41 to 58° C. Melting points are measured by differential scanning calorimetry, taking the temperature at the peak of the melting curve as the melting point. Examples of suitable waxes include hydrogenated soy wax and hydrogenated palm wax.

A second triglyceride will be of a lower melting point than that of the first triglyceride. It may also be referred to as a wax or a low-melting wax, although it may also considered in some instances an oil. The lower-melting wax may have a melting point of less than 35° C. The lower limit of its desirable melting point is not particularly fixed, but may be conveniently taken as 15 or 18 or 20° C. Typical melting points of the lower-melting wax may be 20 to 30° C., or 22 to 26° C.

The degree of saturation of a triglyceride wax, which is one underlying chemical feature that influences its melting point, may be expressed in terms of iodine value, expressed as g of iodine that is considered to react with 100 g of triglyceride (although in practice the triglyceride is typically tested by reacting with potassium iodide). The procedure is set forth in ASTM D 460. More highly unsaturated (and thus lower melting) triglycerides will have a relatively higher iodine number, and more saturated (and thus higher melting) triglycerides will have a relatively lower iodine number. Thus, the higher melting waxes in the present technology may have an iodine number of 40 to 100 (g/100 g) or 45 to 80 or 50 to 65 and the lower melting waxes may have an iodine number of 70 to 150 or 70 to 130 or 70 to 120. The overall mixture of waxes may have an iodine number of 40 to 120 or 50 to 100. The lower melting wax may have an iodine number that is 5 to 90 or 10 to 80 or 15 to 70 units greater than that of the higher melting wax.

The relative weight amounts of the higher melting and the lower melting triglyceride wax may vary. In certain embodiments the ratio of high:low may be about 1:1, such as 1:1.1 to 1.1:1, or more broadly 1:10 to 10:1 or 1:5 to 5:1 or 1:2 to 2:1 or 1:1.3 to 1.3:1. If more than two triglycerides are present, they may be grouped together as comprising a higher melting component and/or a lower melting component, and the components taken as a whole would exhibit the above-described relationships with each other.

The amount of the first, higher melting triglyceride may be 15 to 40 weight percent of a coating composition, or 20 to 35 percent, or 25 to 30 percent. Similarly, the amount of the second, lower melting triglyceride may be 15 to 40 weight percent of a coating composition, or 20 to 35 percent, or 25 to 30 percent. These amounts are particularly applicable when the coating composition is in the form of a concentrate that is designed to be subsequently diluted with oil or volatile solvent for application to a surface. When diluted in this way, the amounts of the higher melting triglyceride may be 1 to 18 percent by weight, or 2 to 13 or 5 to 10, or 6 to 7 percent. Similarly, the diluted amount of the lower melting triglyceride may be 1 to 18 percent by weight, or 2 to 13, 5 to 10, or 6 to 7 percent. The total amount of the triglycerides in a concentrate may be 40 to 70 percent by weight, or 45 to 65 percent, or 48 to 60 percent, or 50 to 55 percent. In a diluted coating composition the total amount of the triglycerides may be 2 to 35 percent by weight, or 5 to 25 percent, or 10 to 20 percent, or 10 to 11 percent.

The coating compositions of the disclosed technology will also contain one or more solubility agents. The solubility agent is useful to assist in assuring solubility of the triglycerides in the coating composition, both within a concentrate and in a subsequent dilution in oil or solvent. If the triglycerides are not fully soluble, they may not be dissolved initially in the formulation or concentrate, or they may precipitate out of solution to a greater or lesser extent upon standing. Such insolubility is unacceptable from an end user's standpoint as the precipitation can cause fouling of the application equipment and inconsistent product performance.

The solubility agent is typically a hydrocarbon-soluble ester-containing polymer. It will have at least one branch or side chain of 10 to 36 carbon atoms and will have an overall number average molecular weight of 5000 to 300,000. In one embodiment the ester functionality of the polymer will be pendant from the main polymer chain and the branches or side chains will be associated with the pendant ester functionality. This would be in distinction from polymers in which the ester functionality is within the main polymer chain, such as, for instance, polyethylene terephthalate.

The ester-containing polymer may comprise a copolymer of an alkyl ester with vinyl acetate or with a vinyl aromatic compound, wherein the alkyl group contains 12 to 22 carbon atoms. More particularly, in certain embodiments the ester-containing polymer may comprises units of polymerized ester of maleic acid or fumaric acid.

In certain embodiments, the ester-containing polymer may be a polymer comprising at least one monomer of a least one alkyl ester of an ethylenically unsaturated 1,2-diacid, wherein the alkyl groups of the ester contain on average 10 to 36 carbon atoms This material is a polymer which has a substantially carbon chain backbone derivable from the addition polymerization of an ethylenically unsaturated diacid, optionally with other comonomers, described below. The polymerized acid groups are at least partly, and may be substantially completely, in the form of alkyl esters. Reference herein to polymerization of acids is not intended to be limiting to the use of the actual acid in the polymerization reaction, but encompasses polymerization of esters and other materials which can be converted into esters, including anhydrides and acid halides.

Diacids which are capable of polymerization may encompass those ethylenically unsaturated acids having 3 to 6 carbon atoms, including those with α,β-ethylenic unsaturation. Specific materials include fumaric acid, maleic acid, itaconic acid, and citraconic acid and their reactive equivalents. Among these diacids, fumaric acid may be used; the corresponding dialkyl ester is a dialkyl fumarate. It is understood that maleic acid and fumaric acid become substantially equivalent after they are polymerized, since their double bond becomes a single bond during the polymerization reaction, although details of the stereochemistry of the resulting polymer may differ. References herein to polymers of fumaric acid or fumaric esters are intended to include polymers similarly derived from maleic acid, maleic anhydride, or maleic esters.

The polymers useful in the present technology may be prepared directly from an ester of the acid, from the acid itself, or (in the case of certain diacids) the anhydride, or from other reactive monomers. If the polymer is prepared from one of the materials other than the ester it can be converted into the ester form by reaction of the polymer with a suitable alcohol or by other well-known reactions.

The alcohol with which the acid monomer or the polymeric acid functionality or equivalent thereof is reacted to form the ester is an alcohol with an alkyl chain containing 10 to 36 carbon atoms, such as 10 to 28 or 12 to 22 carbon atoms. This assures that there is at least one alkyl branch in the solubility agent of 10 to 36 carbon atoms. The alkyl group need not be derived from a single alcohol of a single chain length, however, but can be derived from a mixture of alcohols if desired, provided that at least on average the chain lengths of the alcohol portion fall within the desired range.

The ester-containing polymer of component (c) may also contain other monomers derived from ethylenically unsaturated compounds. These comonomers can be short chain ester-containing monomers. Examples of short chain ester-containing monomers include vinyl alkanoates where the alkanoate moiety contains up to 8 carbon atoms and preferably up to 4 carbon atoms, such as vinyl acetate, vinyl propionate, and vinyl butyrate. Other examples are short chain esters of unsaturated acids, having fewer than 8 or 10 carbon atoms, such as up to 4 carbon atoms in the alcohol-derived moiety. Such short chain esters include methyl acrylate, methyl methacrylate, ethyl acrylate, ethyl methacrylate, propyl acrylate or methacrylate, and n-butyl, t-butyl, and isobutyl acrylate or methacrylate. Alternatively, or additionally, the polymer can contain short chain alkyl ether comonomers, where the alkyl group has up to 8 carbon atoms and preferably up to 4 carbon atoms. Examples are vinyl ether groups such as the alkyl vinyl ethers, e.g., ethyl vinyl ether, propyl vinyl ether, and the butyl vinyl ethers.

A suitable comonomer is vinyl acetate, and the copolymer is, in one embodiment, a copolymer with an alkyl fumarate, such as a dialkyl fumarate, with vinyl acetate. The mole ratio of alkyl fumarate to vinyl acetate may, in certain embodiments, range from 1:2 upwards to 100 mole percent alkyl fumarate (that is, a homopolymer); in some instances the mole ratios may be 1:2 to 2:1, or 0.9:1 to 1:0.9.

The polymer of component (c) may also contain other copolymerizable monomers such as α-olefins, including ethylene or propylene, or vinyl aromatic monomers such as styrene, as well as, optionally, carbon monoxide or sulfur dioxide. The amount of these and other supplemental comonomers, if any, may be sufficiently low that the polymer substantially retains its character as a hydrocarbyl alkenoate polymer, modified by the presence of the above-defined comonomers.

The polymers of component (c) can be prepared by known methods. In one case di-($C_{12}$-$C_{14}$) fumarate is mixed with an appropriate amount of vinyl acetate or styrene, and the reactants mixed and heated, with or without a solvent or diluent, in the presence of a small amount of an initiator at 25° C. to 150° C., or up to 100° C. Since the polymerization is exothermic, cooling may be required to maintain the reaction mixture at the desired temperature. It may be convenient to add one of the reactants to the other reactant or reactants over a period of time in order to control the rate of the reaction. The polymerization may be carried out in the presence of a small amount of an initiator such as an organic peroxide such as benzoyl peroxide, or azobis-isobutyronitrile. Often 0.01 to 1.5% of the initiator may be used. The reaction time may vary from 1 to 30 hours depending on the temperature, reactivity of the monomers, and other reaction conditions. The polymerization can be run continuously or batchwise. Details of such polymerizations are well known to those skilled in the art and are reported in greater detail in U.S. Pat. No. 3,250,715. The polymers are also described in U.S. Pat. No. 6,017,370.

The molecular weight of the resulting polymer will depend on a variety of factors under the control of the skilled operator, including concentrations of monomers and catalyst. The polymer as used in the disclosed technology may have a number average molecular weight of 5,000 to 400,000, or 6,000 to 100,000, or 8,000 to 50,000, or 10,000 to 45,000.

The solubility agent may be present in an amount of 0.1 to 10 percent by weight, or 0.5 to 5 percent by weight, in a concentrate. In a fully formulated and diluted coating composition, ready for application to a surface, its amount may be 0.005 to 7 percent by weight, or 0.01 to 5, or 0.02 to 4, or 0.02 to 2.2, or 0.1 to 1.5 percent by weight.

The relative weight ratio of triglyceride (wax) component to the solubility agent may be 1000:1 to 5:1, or 300: 10:1, or 200:1 to 15:1, or 100:1 to 20:1, or 80:1 to 30:1, or 60:1 to 40:1, or 60:1 to 5:1, or alternatively 30:1 to 7:1, or 15:1 to 8:1.

The formulation will typically also contain a salt of an alkylarylsulfonate having one or more hydrocarbyl or alkyl groups of sufficient length to provide solubility in a hydrocarbon oil. The "sufficient length" may be at least 12 carbon atoms and up to 200 carbon atoms, such as 18 to 100 or 24 to 48 carbon atoms in the combined alkyl or hydrocarbyl groups or, alternatively, in the longest of such groups if there is more than one. In one embodiment, each hydrocarbyl or alkyl group may individually contain at least 8 or at least 12 carbon atoms, and up to 200 carbon atoms, or 18 to 100 or 24 to 48. The salt may be a metal salt, an ammonium salt, or an amine (including quaternary ammonium) salt. In one embodiment it may be a metal salt. Examples of metal sulfonate salts include relatively low molecular weight salts such as calcium mono-, di-, or tri-nonyl naphthalene sulfonate (or mixtures of mono-, di-, and tri-alkyl species) and relatively higher molecular weight salts such as calcium oligo- or poly-propene benzenesulfonates or -toluenesulfonates. These may be neutral salts or overbased salts. Neutral salts are those that contain approximately or exactly a stoichiometric amount of metal ion to neutralize the acid functionality of the alkarylsulfonic acid. Overbased salts are prepared by reaction with a stoichiometric excess of metal, such as calcium, barium, magnesium, potassium, zinc, or sodium, in the form of a basic compound such as, in the case of calcium, the oxide, hydroxide or, ultimately, the carbonate as a result of treatment with carbon dioxide. Overbased materials are well known in the lubricant industry as overbased detergents and may also function as surfactants or wetting agents. Optionally, the alkylarylsulfonate may be prepared as a neutral or overbased salt with ammonia or an amine such as methylamine, ethylamine, propylamine, butyl amine, or 2-ethylhexylamine, or a quaternary ammonium cation. They are typically provided in commercial form in the presence of an amount of a diluent oil, typically a mineral oil such as an API Group I oil, in which they are often prepared. The amount of diluent oil that may be associated with and accompany the metal alkylarylsulfonate salt may be in the ratio of 1:5, to 5:1 of the salt, to oil. Overbased detergents are described in detail in U.S. Pat. Nos. 2,501,731; 2,616,905; 2,616,911; 2,616,925; 2,777, 874; 3,256,186; 3,384,585; 3,365,396; 3,320,162; 3,318, 809; 3,488,284; and 3,629,109.

The amount of the metal salt of the alkylarylsulfonate in a concentrate will typically be 15 to 40 percent by weight, and in some embodiments 20 to 30 24 to 28 or 18 to 25 percent, on an oil free basis. Its amount in a fully formulated and diluted coating composition will typically be 1 to 30 percent by weight, and in some embodiments 2 to 20 or 3 to 15 or 3 to 8 percent by weight.

The coating compositions of the disclosed technology also includes a carboxylic diacid or polyacid having at least 10 carbon atoms. By "polyacid" is meant a material having three or more carboxylic acid groups. However, if the diacid or polyacid is a diacid having two carboxylic acid groups on adjacent carbon atoms, then the diacid should have at least 14 total carbon atoms. In one embodiment, the diacid or polyacid is a diacid having at least 16 carbon atoms, the two carboxylic acid groups being separated by at least 6 carbon atoms. In such an embodiment, there may also be more than two carboxylic acid groups present, but if so, then at least two of them may be separated by at least 6 carbon atoms which are not themselves substituted by a carboxylic group. The separating carbon atoms in such an embodiment are typically non-aromatic and, in one embodiment, they comprise a carbon chain, that is, without interruption by inserted oxygen or nitrogen atoms. In certain embodiments the carboxylic groups may be separated by 8 to 24 carbon atoms, or 10 to 20, or 12 to 20, or 14 to 18 carbon atoms.

One type of diacid is known as dimer acids or dimerized acids. Dimer acids are products typically prepared by dimerization of long chain, e.g., C18, unsaturated fatty acids. They are often prepared by self-condensation of oleic acid or tall oil fatty acids. Dimer acids are mixtures of relatively high molecular weight materials, m.w. around 560, yet are liquid at room temperature. They are commercially available materials that may be prepared by either a Diels-Alder reaction or by a free radical route, or by catalysis on a substrate such as clay. Among many possible structures for dimer acids, one representative is shown below:

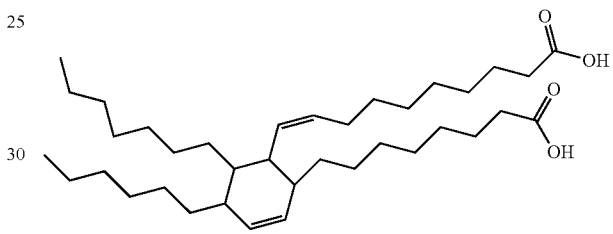

Dimer acids and their preparation are extensively discussed in the *Kirk-Othmer Encyclopedia of Chemical Technology*, Third Edition, volume 7, pages 768-782, John Wiley & Sons, New York (1979).

In another embodiment, a diacid may include a hydrocarbyl-substituted succinic acid having at least 14 carbon atoms including the four carbon atoms of the succinic acid moiety, e.g., succinic acid substituted with a 10-carbon alkyl. In other embodiments there will be at least 12, 14, 16, or 18 carbon atoms in such an alkyl substituent (for a total number of 16, 18, 20, or 22 carbon atoms). The number of atoms in the akyl substituent may be up to 36 or 30 or 24 or 22 carbon atoms.

In another embodiment, the diacid may be an α, ω-alkylene diacid, of at least 10 or 12 carbon atoms, and up to, for instance, 36 or 24 or 18 carbon atoms. Examples include 1,10-decanedioic acid, 1,12-dodecanedioic acid, and 1,18-octadecanedioic acid.

The amount of the above-described diacid or polyacid in the coating composition of the disclosed technology, when in a concentrate, may be 2 to 20 percent by weight, or 3 to 10 percent, or 5 to 6 percent. The corresponding amount in a fully formulated, diluted coating composition may be 0.1 to 14 percent, or 0.2 to 10 percent, or 0.4 to 8 percent, or 0.4 to 5 percent or 1 to 5 percent.

Other materials may also be present that may affect solubility, adhesion, or corrosion protection. For instance, corrosion inhibitors may include thiadiazoles, triazoles, imidazolines, borate esters, phosphorus esters, amines, and carboxylic acids. The amount of a corrosion inhibitor, if present, may be at 0.1 to 30 percent by weight or 0.25 to 20 or 0.5 to 10 percent in a concentrate, or, in a fully diluted coating composition, 0.005 to 20 percent, or 0.01 to 15 percent, or 0.02 to 12 percent, or 0.02 to 7 percent or 0.1 to 5 percent.

Another material that may optionally be present is a phenol-formaldehyde condensate, sometimes referred to as a Novolac resin. The phenol component may be a hydrocarbyl substituted phenol and, in one embodiment, may be a C10-C36, or C22-C24, or C12-C20 alkyl-substituted phenol. Often the formaldehyde to phenol molar ratio may be approximately equal to one or may be less than one, to avoid formation of very high molecular weight material. These condensates may be prepared by reaction of the components, with heating, in the presence of a catalytic amount of acid such as sulfuric acid. The amount of the phenol-formaldehyde condensate, if present, may be 0.1 to 10 percent by weight or 1 to 7 percent, or 2 to 6 percent by weight in a concentrate, or in a fully diluted coating composition, 0.005 to 7 percent, or 0.01 to 5 percent, or 0.02 to 4 percent, or 0.02 to 2.5, or 0.1 to 2 percent by weight.

Another optional material is a hydrocarbon wax, which, if desired, may be present in addition to the triglyceride wax(es) described above. Examples of hydrocarbon waxes include paraffin wax, including synthetic paraffin wax derived from Fischer-Tropsch processes, and microcrystalline wax. The hydrocarbon wax may be a low-melt petroleum wax, such as a paraffin wax having a melting point of 32-36° C. The hydrocarbon waxy may comprise molecules containing 18 to 75, or 20 to 36 carbon atoms. The amount of hydrocarbon wax, if present, will be at a lower amount than would be required in the absence of the triglyceride waxes. Thus it may be present, for instance, at 0.1 to 30 or 1 to 28 or 5 to 25 percent by weight in a concentrate, or, in a fully diluted coating composition at 0.005 to 20 percent, or 0.01 to 15 percent, or 0.02 to 12 percent, or 0.02 to 7 or 0.1 to 5 percent by weight.

Related to hydrocarbon wax (but considered separately for the present discussion) is the optional presence of an oxidized hydrocarbon wax. Any of the above-mentioned hydrocarbon waxes may be present as oxidized waxes. In one embodiment, the oxidized wax may be an oxidized paraffin wax. A paraffin wax may be partially or selectively oxidized by known methods, for instance, by treatment with transition metal catalyst. The oxidized wax will typically contain carboxylic acid functionality, which may be converted to the ester form by reaction with an alcohol such as methanol, ethanol, propanol, butanol, or other linear alcohols. The choice of alcohol can also optionally include branching or ring structures. The amount of oxidized hydrocarbon wax, if present, may be at 1 to 25 percent by weight, or 2 to 20, or 5 to 15 percent, in a concentrate. In a fully formulated, diluted coating composition, the amount may be 0.05 to 18 percent, 0.1 to 13 percent, 0.2 to 10 percent, or 0.2 to 6 percent, or 0.5 to 5 percent by weight.

Another optional material is a fatty acid, which is to be distinguished from the diacid or dimer acids described above. Fatty acids are typically carboxylic acids with a carbon chain of 8 to 24 carbon atoms, often derived by hydrolysis of natural oils or fats. They may be saturated or unsaturated and may contain additional substituents such as a hydroxy group. Fatty acids are well known and may typically include stearic acid or hydroxystearic acid. The amount of fatty acid, if present, may be 0.1 to 8 percent by weight, or 0.5 to 6, or 1 to 5, or 3 to 5 percent. In a fully formulated, diluted coating composition, the amount may be 0.02 to 1.6 percent, or 0.1 to 1.2, or 0.2 to 1, or 0.6 to 1 percent.

The coating composition may also optionally contain an organic solvent. There will normally be some organic solvent, typically of hydrocarbon oil or mineral oil, that accompanies the metal salt of an alkylarylsulfonate, in the relative amounts as described above, and in a concentrate the amount of such solvent may be 10 to 30 percent by weight or 15-25, 12-16 or 14-15 percent of the concentrate, which will be an amount sufficient to dissolve the metal salt. Additional solvent may also optionally be present in the concentrate, if desired, although the majority of the solvent will be added in preparing the fully formulated, diluted coating composition. The amount of solvent will typically be an amount to provide for appropriate viscosity and rheological performance so that the coating composition may be applied to a metallic article or substrate. Thus, if the concentrate is diluted to 20 percent in the final coating composition, the total amount of solvent will typically be 2 to 4 percent from the metal alkylarylsulfonate plus 80 percent additional solvent to make the dilution, for a total of 82-84 percent solvent. The overall total amount of solvent will depend, of course, on the amount of dilution used to prepare the final coating composition and so may be 40 to 95 percent by weight 60 to 88 or 80 to 86 or 82 to 84 percent by weight.

The organic solvent may comprise an oil, such as natural or synthetic oils, oil derived from hydrocracking, hydrogenation, and hydro-finishing, unrefined, refined, re-refined oils, or mixtures thereof. A more detailed description of unrefined, refined and re-refined oils is provided in International Publication WO2008/147704, paragraphs [0054] to [0056] and in the corresponding paragraphs of US-2010-0197536. A more detailed description of natural and synthetic lubricating oils is described in paragraphs [0058] to [0059] respectively of WO2008/147704. Synthetic oils may also be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils. In one embodiment, the oil may be selected from any of the base oils in Groups I-V as specified in the American Petroleum Institute (API) Base Oil Interchangeability Guidelines. The five base oil groups are as follows: Group I: >0.03% sulfur and/or <90% saturates and viscosity index (VI) 80 to 120; Group II: ≤0.03% sulfur and ≥90% saturates and VI 80 to 120; Group III: ≤0.03% sulfur and ≥90% saturates and VI>120; Group IV: all polyalphaolefins; Group V: all others. Groups I, II and III are mineral oil base stocks. Natural oils also include vegetable oils such as coconut oil, castor oil, olive oil, peanut oil, rapeseed (canola) oil, corn oil, sesame seed oil, cottonseed oil, soybean oil, palm oil, sunflower oil, safflower oil, linseed oil, and tung oil.

The organic solvent may also comprise a volatile organic solvent such as naphtha (also known as petroleum ether), mineral spirits, kerosene, ethyl lactate, and the like. These may be hydrocarbon solvents. Such materials may have a boiling point of 30 to 60° C. or higher temperatures, up to a range of 175 to 280° C.

The coating composition may also, optionally, contain one or more additional components or additives that are conventionally used in coating metals, in conventional amounts. Such optional additives may include antioxidants, polymeric film formers such as acrylic polymers, surfactants (including wetting agents), colorants, defoamers, demulsifiers, and rheology modifiers. In one embodiment the coating composition contains a demulsifier, which materials are commercially available and well known to those skilled in the art.

The coating compositions of the disclosed technology may be prepared by mixing the desired components together with stirring and, if desired, with heating. There is no particular required order of mixing, and the details of the mixing of any particular composition will be apparent to the skilled person. It may be desirable, for instance, to avoid processing or mixing conditions that would lead to saponification of the waxes, such as high temperatures or the presence of strong acid or base.

The described compositions find particular advantageous use as coatings on metal surfaces. Often the metal surfaces may be ferrous metal surfaces that are subject to rust, such as steel and cast iron, although many non-ferrous metal surfaces (e.g., aluminum, copper, brass) can derive protection and thereby benefit from the described compositions as well. Ferrous surfaces are considered also to include treated iron or steel surfaces, such as galvanized steel surfaces, galvanized zinc phosphate surfaces, or zinc phosphate treated steel surfaces. The protection may be from rust or other forms of corrosion or, in some embodiments, protection from various types of contamination such as by dirt or graffiti. In some embodiments, the coatings may be useful to provide protection to an article for a period of weeks or months, for instance, during shipping, storage, or manufacture, rather than for years as might be typical of a paint or other permanent coating. In other embodiments, however, the coating may be left on the surface indefinitely (e.g., even for a period of years).

The coating composition of the disclosed technology may be applied to an article or surface by brushing, rolling, dipping, curtain coating, doctor blading, wiping, or spraying. Spraying may be effected using an airless spray/pump device, conventional air spray, or an electrostatic method. The applied coating may have any thickness desired, such as 2 μm to 200 μm or 5 to 150 μm, or 10 to 100 μm.

If the coating composition, as applied, contains a volatile solvent, that solvent will typically be removed as a part of the coating process, prior to shipment, storage, or use of the coated material. Drying (or evaporation of the solvent) may be conducted with heat and ventilation, with ventilation or air flow, or by other known means. The thickness of the coating, after solvent removal, will typically differ from the thickness of the coating as applied (including volatile solvent), so correction therefor may be made, as will be recognized by the person skilled in the art. In certain embodiments the coating composition may contain a non-volatile solvent that will not be removed by drying or evaporating.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, byproducts, derivatives, and other such materials which are normally understood to be present in the commercial grade.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, including aliphatic, alicyclic, and aromatic substituents; substituted hydrocarbon substituents, that is, substituents containing non-hydrocarbon groups which, in the context of this invention, do not alter the predominantly hydrocarbon nature of the substituent; and hetero substituents, that is, substituents which similarly have a predominantly hydrocarbon character but contain other than carbon in a ring or chain. A more detailed definition of the term "hydrocarbyl substituent" or "hydrocarbyl group" is found in paragraphs [0137] to [0141] of published application US 2010-0197536.

It is known that some of the materials described above may interact in the final formulation, so that the components of the final formulation may be different from those that are initially added. For instance, metal ions of one compound may migrate to acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

The invention herein is useful for imparting rust and corrosion preventive properties and performance to metal surfaces, such as anti-rust performance for ferrous metal surfaces, as may be better understood with reference to the following examples.

EXAMPLES

Coating compositions are prepared by combining the ingredients as shown in Table I below. Amounts are in weight percent and may not total 100% because of rounding. The natural oils/waxes listed are commercially purchased and are hydrogenated to some degree. Their melting points (peak) are as measured by differential scanning calorimetry and may differ somewhat from the melting points reported in the trade literature. The compositions in the table are in the form of concentrates which may be diluted at, e.g., 20% concentrate+80% oil or solvent to prepare a final formulation for coating on a metal surface.

TABLE I

|  | Ex. 1* | Ex. 2 | Ex. 3 | Ex. 4 | Ex. 5 | Ex. 6 | Ex. 7 |
|---|---|---|---|---|---|---|---|
| Soy wax, m.p. 44° C. | * | 26.2 | 26.2 | 37 |  |  | 25.4 |
| Palm wax, m.p. 41° C. |  |  |  |  | 12.2 |  |  |
| Soy wax, m.p. 58° C. |  |  |  |  | 7.2 | 30 |  |
| Soy wax, m.p. 24° C. |  | 26.2 |  | 18 | 28.4 |  | 25.4 |
| Coconut wax, m.p. 23° C. |  |  | 26.2 |  |  | 18.6 |  |
| Oxidized petroleum wax (C 20-36), butyl ester |  |  |  |  | 0.5 |  |  |
| Copolymer of C16-18 alkyl fumarate and vinyl acetate, wt ratio ~8:1, m.w. ~256,000 |  | 1.0 | 1.0 |  |  | 1.6 | 1 |

TABLE I-continued

| | Ex. 1 | Ex. 2 | Ex. 3 | Ex. 4 | Ex. 5 | Ex. 6 | Ex. 7 |
|---|---|---|---|---|---|---|---|
| Copolymer of C12-22 alkyl fumarate and vinyl acetate, wt ratio ~7:1, m.w. ~137,000 | | | | 5.0 | | | |
| Copolymer of C8-18 alkyl ester of maleic anhydride & styrene, wt ratio ~4:1, m.w. ~50,000 | | | | | 0.5 | | |
| Stearic acid | | | | | | 1.0 | 2.9 |
| Dimerized C-18 fatty acid | 4.1 | 4.1 | | | 3.0 | | 3.9 |
| Dimerized mixed C-12-C-18 fatty acids | | | | 6.0 | | 4.1 | |
| C-12 alkyl succinic acid | | | | | | | |
| C-18 alkyl succinic acid | | | | | | | |
| Neutral calcium alkylbenzene sulfonate[a] | 18.1 | 18.1 | 18 | | | | 17.6 |
| Neutral calcium mono-, di-, and tri-C$_9$ alkyl naphthalene-sulfonates | | | | | 23.8 | | |
| Neutral barium alkyltoluene sulfonate | | | | 30 | | | |
| naphthenic mineral oil | 24.5 | 24.5 | 16 | | | | 23.8 |
| paraffinic mineral oil | | | | 18.2 | 10 | | |
| mineral spirits | | | | | 10 | | |

| | Ex. 8 | Ex. 9 | Ref. Ex. 10 | Ex. 11 | Ex. 12 | Ex. 13 | Ref. Ex. 14 |
|---|---|---|---|---|---|---|---|
| Soy wax, m.p. 44° C. | 26.1 | 34.7 | 52.4 | 26.5 | 26.4 | 26.6 | 27.3 |
| Palm wax, m.p. 41° C. | | | | | | | |
| Soy wax, m.p. 58° C. | | | | | | | |
| Soy wax, m.p. 24° C. | 26.1 | | | | | | |
| Coconut wax, m.p. 23° C. | | | 17.3 | | 26.5 | 26.4 | 26.6 | 27.3 |
| Oxidized petroleum wax (C 20-36), butyl ester | | | | | | | |
| Copolymer of C16-18 alkyl fumarate and vinyl acetate, wt ratio ~8:1, m.w. ~256,000 | 1 | 1 | 1 | | 1 | 1 | 1 |
| Copolymer of C12-22 alkyl fumarate and vinyl acetate, wt ratio ~7:1, m.w. ~137,000 | | | | | | | |
| Copolymer of C8-18 alkyl ester of maleic anhydride & styrene, wt ratio ~4:1, m.w. ~50,000 | | | | | | | |
| Stearic acid | 3.0 | | | | | | |
| Dimerized C-18 fatty acid | 4.0 | 4.0 | 4.1 | 4.1 | | | |
| Dimerized mixed C-12-C-18 fatty acids | | | | | | | |
| C-12 alkyl succinic acid | | | | | 2.1 | | |
| C-18 alkyl succinic acid | | | | | | 2.65 | |
| Neutral calcium alkylbenzene sulfonate[a] | 22.3 | 24.7 | 18.1 | 18.3 | 18.2 | 18.4 | 18.9 |
| Neutral calcium mono-, di-, and tri-C$_9$ alkyl naphthalene-sulfonates | | | | | | | |
| Neutral barium alkyltoluene sulfonate | | | | | | | |
| naphthenic mineral oil | 17.6 | 18.3 | 24.5 | 24.7 | 26.0 | 24.9 | 25.2 |
| paraffinic mineral oil | | | | | | | |
| mineral spirits | | | | | | | |

*A reference or comparative example - a commercial material containing petroleum wax(es) and oxidized wax(es), dimer fatty acid(s), calcium alkylbenzene sulfonate, and mineral oil.
~means "about". Molecular weights are weight average

[a]prepared from calcium hydroxide and mixed mono- and di-alkylbenzene-sulfonic acids with largely C12 alkyl groups Amount is presented absent conventional diluent oil, which is included in the amount of mineral oil listed separately. Includes small amounts of various processing aids normally present in the commercial material.

Certain of the above formulations are diluted to 20% in mineral oil or mineral spirits, as noted, and subjected to testing. The first set of tests is room temperature solubility. 20% mixtures of the formulations in the solvents noted in Table II are agitated and then allowed to stand at room temperature. After 28 days, the mixtures are visually evaluated and each found to be clear, indicating good solubility.

TABLE II

| Solubility | Mineral spirits | API Group I paraffinic oil | Naphthenic mineral oil | API Group II paraffinic oil |
|---|---|---|---|---|
| Ex. 1 (ref) | clear | clear | clear | clear |
| Ex. 2 | clear | clear | clear | clear |
| Ex. 3 | clear | clear | clear | clear |

TABLE II-continued

| Solubility | Mineral spirits | API Group I paraffinic oil | Naphthenic mineral oil | API Group II paraffinic oil |
|---|---|---|---|---|
| Ex. 7 | clear | clear | clear | sl. ppt. |
| Ex. 8 | clear | clear | clear | clear |
| Ex. 9 | clear | clear | clear | clear |
| Ref. Ex. 10 | n.d. | n.d. | n.d. | n.d. |
| Ref. Ex. 11 | sl. ppt. | sepn. | sl. ppt. | sepn. |
| Ex. 12 | clear | clear | clear | n.d. |
| Ex. 13 | clear | clear | clear | n.d. |
| Ref. Ex. 14 | clear | clear | clear | n.d. | n.d. = not determined
sl. ppt. = slight precipitation
sepn. = separation

The examples of the disclosed technology exhibited the same excellent solubility as the commercial material of Example 1. The only exception is a slight precipitate observed from the formulation of Example 7 in one grade of oil which, however, is not present in an identical formulation reported as Example 8. In contrast, the material of Reference Example 11, without the solubility agent, shows commercially unacceptable precipitation or separation from solution.

Samples of some of the Examples are dissolved in mineral spirits and applied to steel surfaces which are subjected to the Salt Spray test as described in ASTM B 117. The test formulation is applied to multiple types of steel. The typical thickness of the dipped coatings is about 4 μm. Hours to failure is the time at which at least 5% of the treated surface shows rust as described in ASTM D610. Two numbers are given for each sample, the first being the last hour of passing and the second being the first hour of failure. Multiple entries represent multiple runs. Results are shown in Table III.

showing an apparent failure of an otherwise good formulation, and the few such instances are noted in a footnote to the table.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as optionally modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration. The expression "consisting of" or "consisting essentially of," when applied to an element of a claim, is intended to restrict

TABLE III

| | Ex. hr. to failure | | | | | | | | | | |
|---|---|---|---|---|---|---|---|---|---|---|---|
| | 1 (R) | 2 | 3 | 7 | 8 | 9 | 10 (R) | 11 (R) | 12 | 13 | 14 (R) |
| A, panel 1 | 80-144 | 408-424* | 312-328 | 400-408, 520-584, 288-304 | 328-336 | 336-400 | 0-64 | 336-344 | 216-224* | 224-240 | 24-40, 0-4, <6 |
| A, panel 2 | 72-80 | 312-328* | 264-280 | 240-304, 520-84 | >64** | 336-400 | 0-64 | 368-392 | 224-240* | 192-200 | 24-40, 0-4, <6 |
| B, panel 1 | 168-232 | 624-640 | n.d. | 912-928 | n.d. | n.d. | n.d. | n.d. | n.d. | n.d. | n.d. |
| B, panel 2 | 264-280 | 624-40 | n.d. | 744-760 | n.d. | n.d. | n.d. | n.d. | n.d. | n.d. | n.d. |

A = coated on Q matte (1008 steel)
B = coated on Bonderite ™ 958 (zinc phosphate steel)
n.d. = not determined
(R) = a reference or comparative example
*In a repeat run of these examples, the results of the Salt Spray test on 1008 steel are very poor, for reasons that are unknown, possibly due to error in formulating, in performing the tests, or in coating the samples.
**panel is removed after 64 hours without failure.
No significant differentiation is seen on samples of electrogalvanized steel.

The results show that the formulations of Examples 2, 3, 7, 8, 9, 12, and 13 impart significantly improved resistant to rust compared with the commercial reference material, while provided good or acceptable solubility performance. Reference Examples 10 and 14, while showing good solubility, do not impart good anti-rust performance. Reference Example 11, while showing good anti-rust performance in a freshly prepared sample, does not have the storage stability required for commercial viability nor to assure anti-rust performance if applied to a surface after storage. It is noted that the salt spray test can occasionally lead to results all species of the type represented by that element, notwithstanding the presence of "comprising" elsewhere in the claim.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A coating composition comprising:
    (a) a first triglyceride having a melting point of 35° C. to about 65° C.;
    (b) a second triglyceride having a melting point of less than 35° C.;
    (c) a hydrocarbon-soluble ester-containing polymer having at least one branch of about 10 to about 36 carbon atoms and having a number average molecular weight of about 5000 to about 300,000;
    (d) a carboxylic diacid or polyacid having at least 10 carbon atoms, provided that if the diacid or polyacid is a diacid having two carboxylic acid groups on adjacent carbon atoms, then said diacid will have at least 14 carbon atoms;
    (e) a salt of an alkylarylsulfonic acid, wherein the alkyl group thereof is of sufficient length to provide solubility of the salt in a hydrocarbon oil; and
    (f) a hydrocarbon oil in an amount sufficient to dissolve said salt;
    wherein the first and second triglycerides are present in a relative weight ratio of about 1:10 to about 10:1, and wherein the relative weight ratio of the sum of components (a) and (b), the triglycerides, to (c), the hydrocarbon-soluble ester-containing polymer, is about 1000:1 to about 5:1.

2. The coating composition of claim 1 wherein the amount of (a) the first triglyceride is about 15 to about 40 percent by weight, the amount of (b) the second triglyceride is about 15 to about 40 percent by weight, the amount of (c) the hydrocarbon-soluble ester-containing polymer is about 0.5 to about 10 percent by weight, the amount of (d) the carboxylic di acid or polyacid is about 2 to about 6 percent by weight, the amount of (e) the salt is about 15 to about 40 percent by weight and the amount of (f) the hydrocarbon oil is about 10 to about 30 percent by weight.

3. The coating composition of claim 1 further comprising (g) an organic solvent in addition to said hydrocarbon oil.

4. The coating composition of claim 1 wherein the amount of (a) the first triglyceride is about 1 to about 18 percent by weight, the amount of (b) the second triglyceride is about 1 to about 18 percent by weight, the amount of (c) the hydrocarbon-soluble ester-containing polymer is about 0.05 to about 3 percent by weight, the amount of (d) the carboxylic diacid or polyacid is about 0.1 to about 3 percent by weight, the amount of (e) the salt is about 1 to about 18 percent by weight, and the amount of (f) the hydrocarbon oil plus any organic solvent (g) is about 40 to about 95 percent by weight.

5. The coating composition of claim 1 wherein the triglyceride of (a) and (b) each independently comprise a hydrogenated vegetable oil.

6. The coating composition of claim 1 wherein at least one of the triglycerides of (a) and (b) is not hydrogenated.

7. The coating composition of claim 1 wherein (c) the ester-containing polymer comprises a copolymer of an alkyl ester with vinyl acetate or with a vinyl aromatic compound, wherein the alkyl group contains about 12 to about 22 carbon atoms.

8. The coating composition of claim 1 wherein (c) the ester component of the ester-containing polymer comprises units of polymerized ester of maleic acid or fumaric acid.

9. The coating composition of claim 1 wherein (d) the carboxylic diacid or polyacid has two carboxylic acid groups separated by at least about 6 carbon atoms.

10. The coating composition of claim 9 wherein (d) the carboxylic diacid or polyacid has at least about 16 carbon atoms.

11. The coating composition of claim 1 wherein (d) the carboxylic diacid or polyacid is a dimer acid.

12. The coating composition of claim 1 wherein the salt of an alkylarylsulfonic acid is a calcium, potassium, barium, zinc, magnesium, or sodium salt or an amine salt.

13. The coating composition of claim 1 further comprising (h) a hydrocarbyl-substituted phenol-aldehyde condensate wherein the hydrorocarbyl group contains about 10 to about 36 carbon atoms.

14. The coating composition of claim 1, further comprising (i) an oxidized hydrocarbon wax of about 18 to about 75 carbon atoms or an ester thereof.

15. The coating composition of claim 1 further comprising one or more hydrocarbon waxes, fatty acids, corrosion inhibitors, antioxidants, polymeric film formers, surfactants, colorants, defoamers, demulsifiers, or rheology modifiers.

16. A metal surface coated with the composition of claim 1.

17. The metal surface of claim 16 being a ferrous metal surface.

18. A method for providing protection to a metal surface, comprising applying thereto the coating composition of claim 1.

19. The method of claim 18 wherein the coating composition comprises a volatile hydrocarbon solvent, and which method further comprises the step of evaporating said solvent.

20. The coating composition of claim 1 wherein the first triglyceride (a) has a melting point of about 38 to about 60° C. and the second triglyceride (b) has a melting point of about 20 to about 30° C.

* * * * *